(12) United States Patent
Chuang

(10) Patent No.: US 6,542,357 B2
(45) Date of Patent: Apr. 1, 2003

(54) SIDEWISE OPENABLE PANEL FOR AN INDUSTRIAL COMPUTER

(75) Inventor: Yung-Shun Chuang, Hsin-Tien (TW)

(73) Assignee: Aaeon Technology, Inc., Taipei (TW)

( * ) Notice: Subject to any disclaimer, the term of this patent is extended or adjusted under 35 U.S.C. 154(b) by 0 days.

(21) Appl. No.: 09/988,552

(22) Filed: Nov. 20, 2001

(65) Prior Publication Data

US 2002/0044414 A1 Apr. 18, 2002

(51) Int. Cl.[7] .................................................. G06F 1/16
(52) U.S. Cl. ..................... 361/683; 312/223.2; 248/917
(58) Field of Search ......................... 361/683, 724–727, 361/684, 688, 686; 312/223.1–223.3; 248/917–923

(56) References Cited

U.S. PATENT DOCUMENTS

| 6,125,028 | A | * | 9/2000 | Matsumoto | 361/681 |
| 6,208,508 | B1 | * | 3/2001 | Ruch et al. | 361/686 |
| 6,426,869 | B1 | * | 7/2002 | White | 361/683 |

* cited by examiner

Primary Examiner—Darren Schuberg
Assistant Examiner—Hung Van Duong
(74) Attorney, Agent, or Firm—Bacon & Thomas

(57) ABSTRACT

An industrial computer having mainly a fastening frame, a computer unit fastened with the fastening frame, a computer unit fastened with the fastening frame, and a control panel openably fastened on one side of the control panel to the fastening frame, wherein the control pane can be opened sidewise to facilitate the repairing and maintenance of the computer unit.

2 Claims, 4 Drawing Sheets

SIDEWISE OPENABLE PANEL FOR AN INDUSTRIAL COMPUTER

BACKGROUND OF THE INVENTION

1. Field of the Invention

An industrial computer having a panel which can be opened sidewise.

2. Description of the Related Art

Conventionally, an industrial computer (please refer to FIGS. 3 and 4) generally includes a panel (a), a fastening frame (b) behind the panel (a), and a control box (c) fastened with the fastening frame (b). Furthermore, an openable lid (d) is provided with the panel (a) to facilitate the operation or control of the computer. The cost of the computer is raised because of the provision of the openable lid (d).

Furthermore, the control box (c) of the conventional industrial computer is fastened directly to the fastening frame (b) with a plurality of screws. The whole conventional industrial computer must be removed from a bracket (e) (shown in FIG. 4), a card or some cards in the control box (c) must be detached and then the control box (c) is removed each time when some parts of the panel (a) need to be repaired. This is inconvenient and time-consuming.

SUMMARY OF THE INVENTION

An objective of the present invention is to provide an improved industrial computer having a sidewise openable panel to facilitate the repairing and maintenance of the industrial computer.

Another objective of the present invention is to provide an improved industrial computer which can achieve a modulated design, so as to lower the cost, and more easy for maintenance.

DETAILED DESCRIPTION OF THE PREFERRED EMBODIMENT

Figure 1:
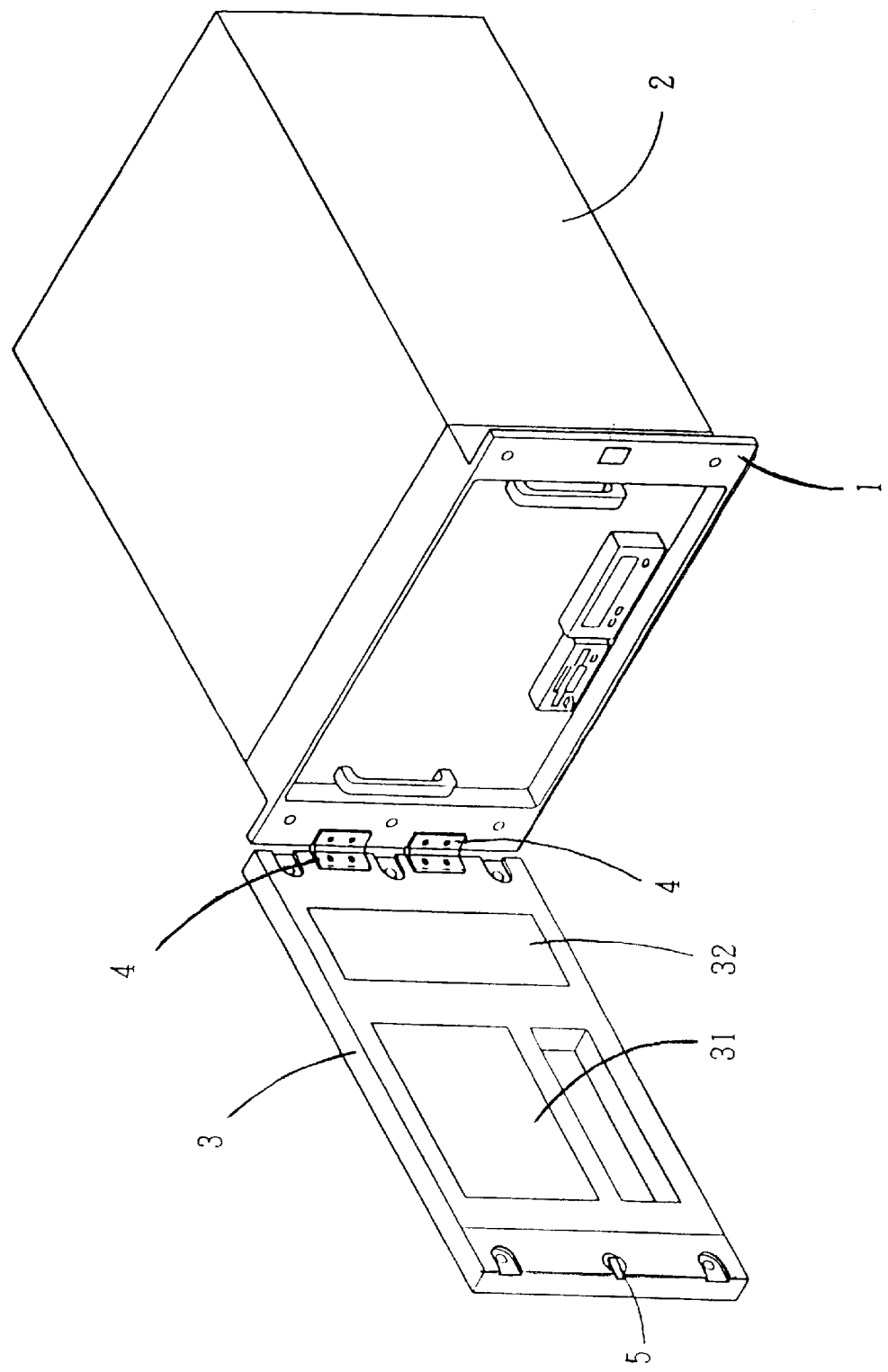
FIG. 1 is a perspective view of a preferred embodiment of the present invention, with a control panel in the opened position.
Figure 2:
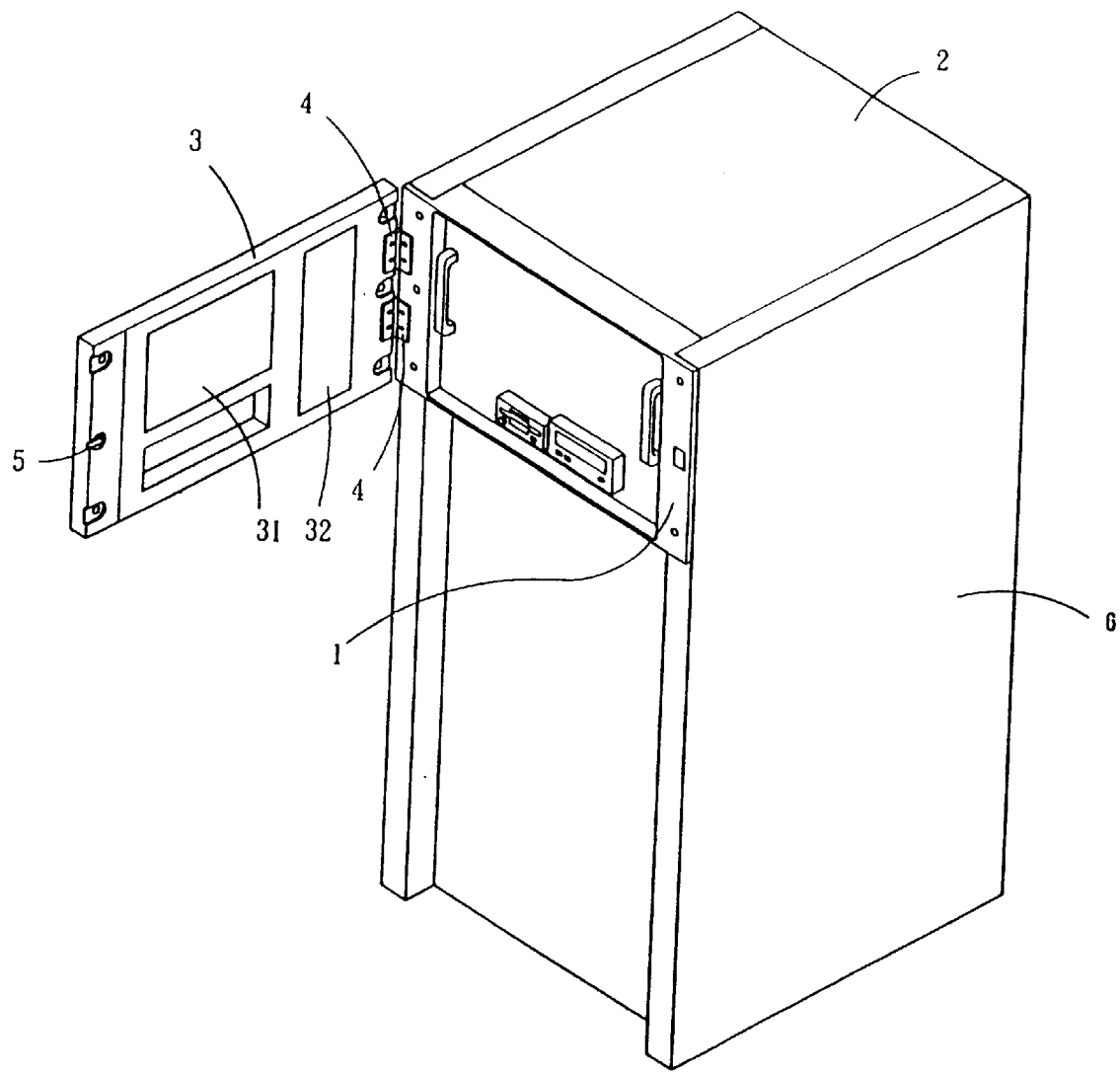
FIG. 2 is a perspective view showing an example of the status of using the preferred embodiment shown in FIG. 1.
Figure 3:
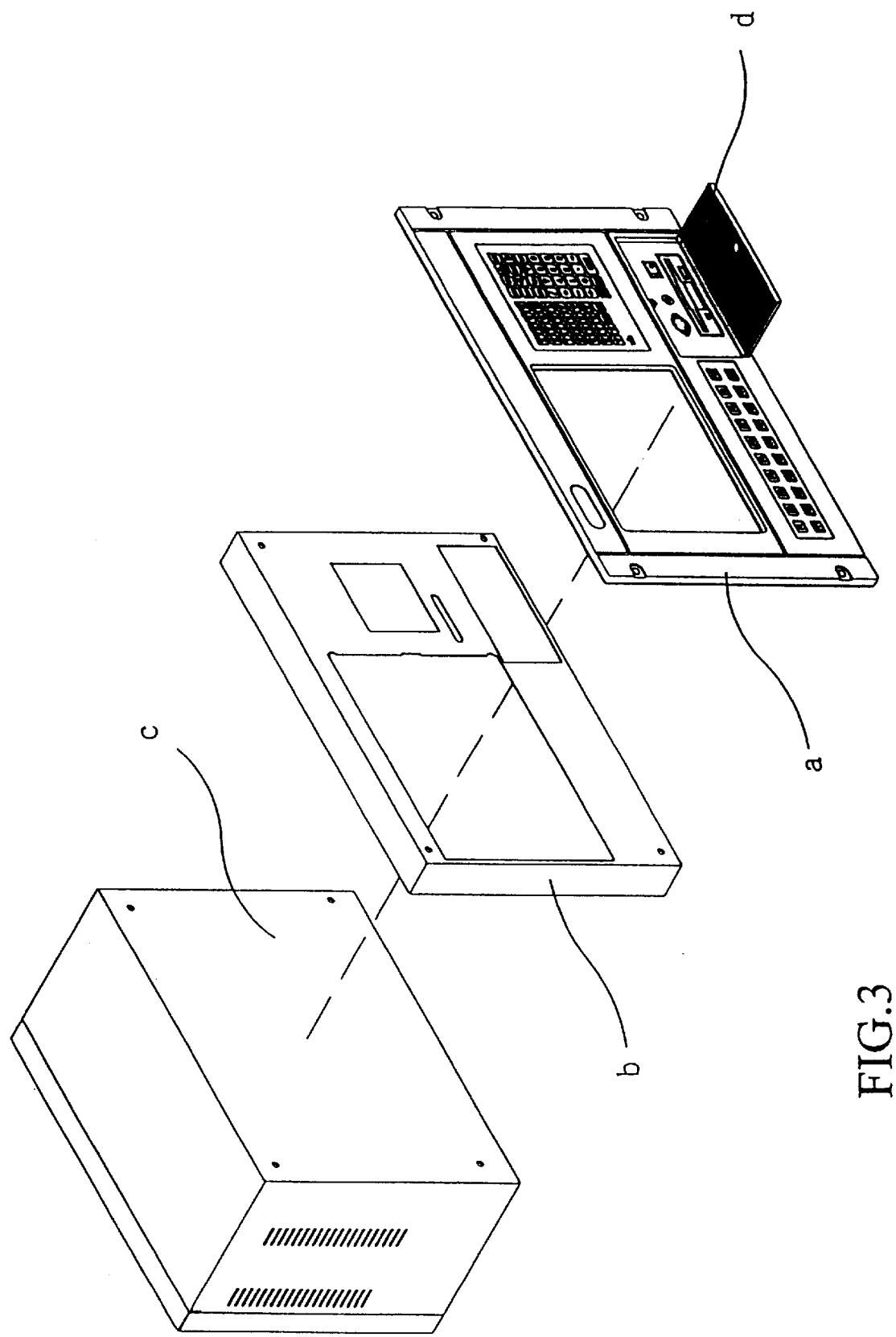
FIG. 3 is an exploded perspective view of a conventional industrial computer.
Figure 4:
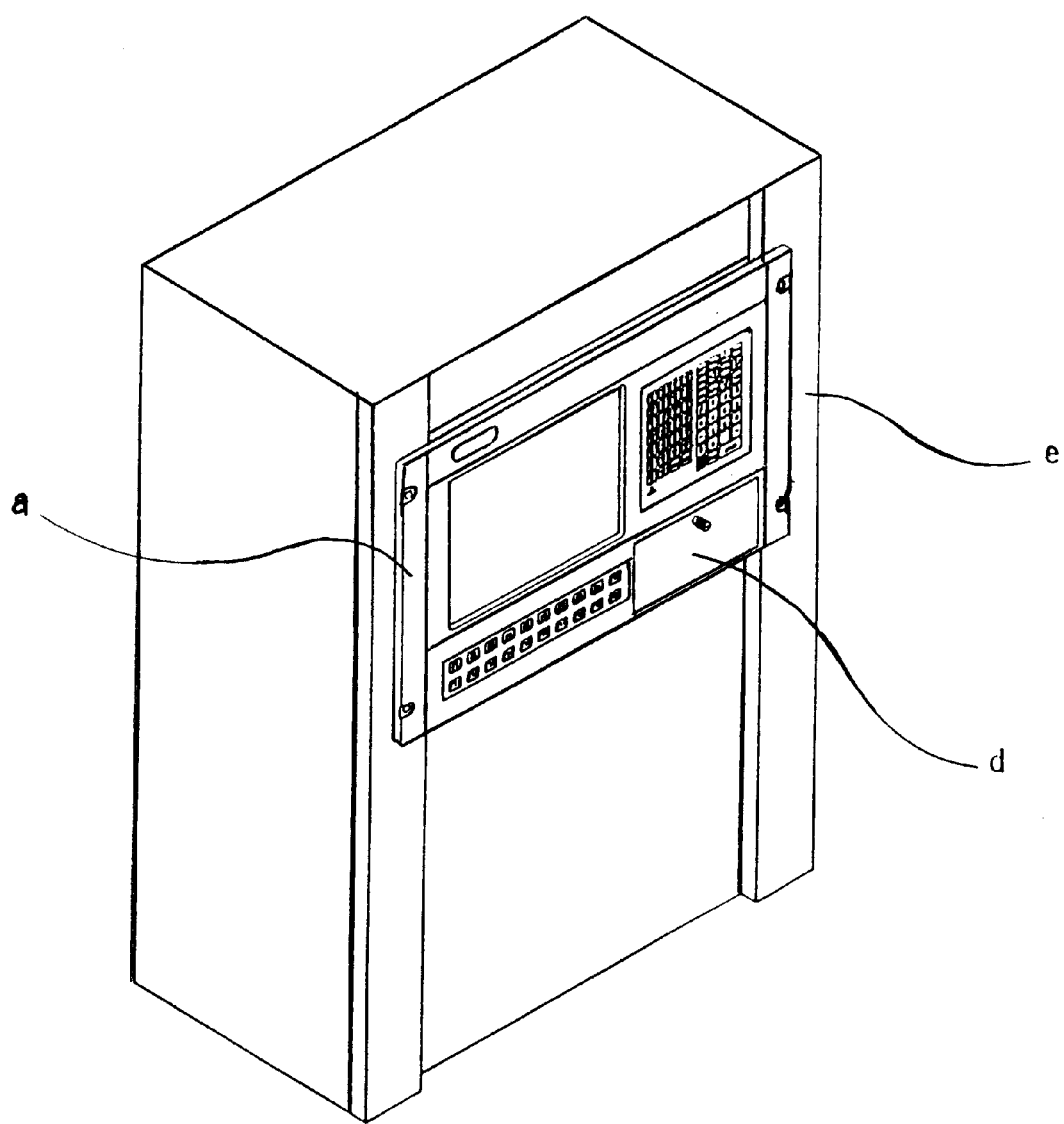
FIG. 4 is a perspective view showing an example of the status of using the conventional industrial computer shown in FIG. 3.

Please refer to FIGS. 1 and 2, a panel fastening frame 1 is fastened with a computer unit 2, and is also fastened with a control panel 3 on the front thereof. The control panel 3 is fastened on one side to the panel fastening frame 1 with a plurality of hinges 4 so that the control panel 3 can be opened sidewise to facilitate the repairing and maintenance of the parts. A lock 5 or some screws or fasteners (not shown in the drawings) can be provided on the other side of the control panel 3 so that the control panel 3 can be kept closed and the computer unit 2 can be prevented from unauthorized manipulation.

According to the structure described herein above, the control panel 3 can be opened sidewise as long as the lock 5 is unlocked and thus the front side of the computer unit 2 can be exposed and a motherboard or the parts can be repaired or replaced.

Furthermore, the control board 3 can be provided with an Display unit 31 and a keyboard 32. When the Display unit 31 and/or the keyboard 32 cannot function properly, the lock 5 can be unlocked, the control panel 3 can be opened sidewise, the Display unit 31 and the keyboard 32 can be removed from behind the control panel 3. Therefore, it is not necessary to detach the whole industrial computer from a bracket 6 and to remove several screws, in order to do the repairing or replacement, thus a lot of time can be saved.

I claim:

1. An industrial computer having mainly a fastening frame, a computer unit fastened with the fastening frame, and a control panel openably fastened on one side thereof to the fastening frame, characterized in that:

the control panel is openably fastened on one side thereof to the fastening frame with at least one hinge or other fastening means so that the control panel can be opened sidewise; and the control panel is provided with a locking means on the other side thereof so that the control panel can be prevented from being opened without authorization and the computer unit can be prevented from unauthorized manipulation, wherein the control panel is further provided with at least one display unit and at least one keyboard which can be detached easily from behind the control panel when the control panel is opened sidewise.

2. The industrial computer as claimed in claim 1, wherein the locking means is a lock, several screws or a fastening means.

* * * * *